March 2, 1954     K. ENSSLIN ET AL     2,670,500
PROCESS FOR THE PRODUCTION OF POROUS FOILS FROM VISCOSE
Filed Aug. 8, 1950
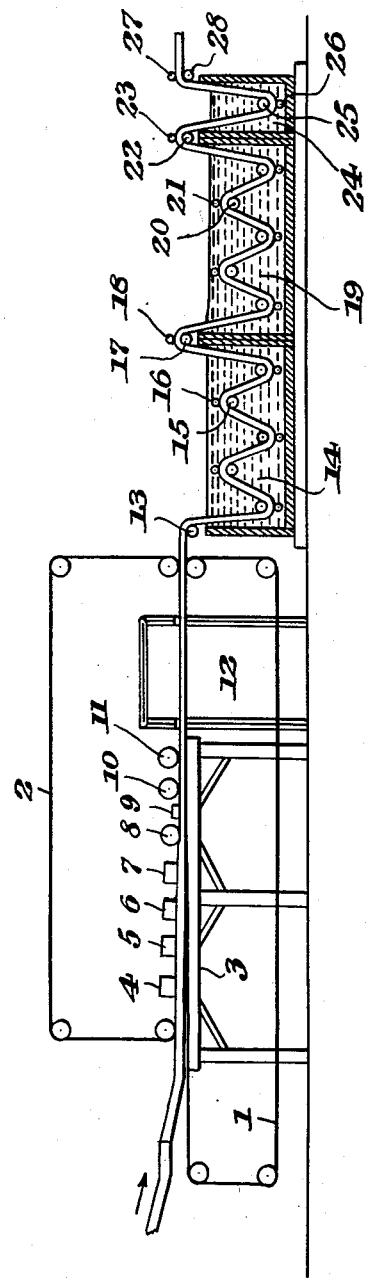
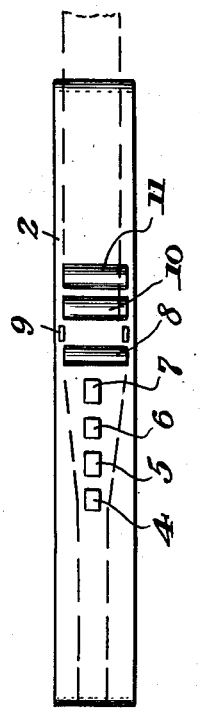
Inventor,
KURT ENSSLINN AND HERMANN RATHERT
By Wenderoth, Lind and Ponack
Attys.

Patented Mar. 2, 1954

2,670,500

UNITED STATES PATENT OFFICE 2,670,500

PROCESS FOR THE PRODUCTION OF POROUS FOILS FROM VISCOSE

Kurt Ensslin, Oberbruch, and Hermann Rathert, Wuppertal-Elberfeld, Germany, assignors to Vereinigte Glanzstoff-Fabriken A. G., Wuppertal-Elberfeld, Germany Application August 8, 1950, Serial No. 178,254

10 Claims. (Cl. 18—47.5)

This invention relates to a process for the production of porous foils from viscose for use as a leather substitute.

Complete success has not heretofore been obtained in the production of artificial leather having an appropriate softness together with a high serviceability as well as sufficient absorptive power so that it can be used for example as a window leather. This is due to the fact that in the production of such kinds of artificial leather a start has either been made from unsuitable starting materials or else the requirements needed to give the product the desired properties have not been appreciated. Even when use was made of the experience gained in the field of artificial sponge manufacture and when bodies made by the process were produced in the form of foils, it was still not possible to produce sufficiently highly absorptive and permanent products. Although the manufacture of artificial sponges had already shown how sufficiently strongly sponges could be made and although means were already available for producing pores of the desired size down to less than 0.5 mm. diameter, and although this was possible either when using solid or gaseous pore-formers, it was still not possible to produce products of the strength and absorptive power needed for example for use as window leathers.

A further study of the prerequisites for high absorptive power in a foil has shown that not only a very fine pore structure is needed but also a very smooth surface. In order to give the porous foils these properties and at the same time to give them the necessary strength, namely strength in wringing and rubbing, definite working conditions must be observed which will be described in detail hereinafter.

An object of the present invention is to provide a process for the production of porous foils from viscose overcoming these drawbacks.

Another object of the present invention is to produce a satisfactory porous foil having high absorptive power and a very smooth surface together with sufficient strength under various conditions.

Other and further objects will be apparent in the following detailed description of the invention taken together with the drawings in which:

Figure 1 is a diagrammatic elevational view of one form of the apparatus which can be used in the teachings of the invention, and Figure 2 is a diagrammatic plan view of the apparatus.

The present invention provides a process for the production of porous foils from viscose, wherein the viscose is mixed with strengthening fibers and with grains of a size less than 0.5 mm. of solid inorganic or organic pore-forming compounds, which do not cause premature coagulation of the viscose and can be dissolved out again from the porous foil. This mixture is distributed between two smooth plates, bands or like surfaces, which may be shaped to give an imprint free from sharp edges, pressed to the desired thickness and heated to decompose the cellulose xanthate whilst still associated with at least one of the said surfaces, whereafter the foils so formed are washed and dried.

The process of the present invention may be carried out as a continuous process, as shown in the drawings, and apparatus means are provided including means for pressing out a preformed pasty band of the mixture into a foil by rolling out between two superposed endless moving bands driven in the direction of travel of the pasty band. The lower moving band passes over a supporting table while the upper band passes between pressure rolls. A coagulating and decomposing oven in which the foil, while still between the two moving bands, is coagulated and decomposed by heat is provided, and also a steeping chamber consisting of a number of vats in which the foil can be wet treated with kneading between double conveyor and guide rolls, i. e. acidified, washed, revived and the like, and finally a drying device followed by a reeling device.

Experiments have shown that in order to obtain a high resistance to chafing a start must be made from unripened or only slightly ripened alkali cellulose. The latter must be xanthated with an increased quantity of $CS_2$ preferably between 45 and 60% per CDA, which term as herein used means the cellulose content of the alkali cellulose. This increased quantity of carbon disulphide is needed to prevent premature coagulation and the associated low strength. It may also happen that a paste produced therefrom may otherwise undergo surface coagulation before the final leather-like surface has been obtained. Parts which have prematurely been coagulated in this way are easily separated from the underlying layers and also have a low absorptive power. The cellulose content of the viscose should also be relatively high. The use of viscose which has had little after-ripening is of great importance. With increasing ripeness there is the danger of premature coagulation on the surface layer of the foil.

A cellulose xanthate mixture of this kind serves as the basis for forming a paste. Approximately 2% of dyestuff, calculated on cellulose, is first added to the mixture. A pore-former of a granular size less than 0.5 mm. is then added to the viscose in a quantity of 8 to 30 times, likewise calculated on the cellulose in the viscose, in as uniform as possible a distribution. The uniform distribution is naturally of decisive importance. For this purpose all solid organic or inorganic compounds are suitable which do not cause premature coagulation of the viscose and which can be dissolved out of the foil again. Thereafter more than 40% calculated on the cellulose in the viscose, of strengthening fibers with a sufficient wet strength and a staple length of about 30 mm. are added. The fibers must be finely loosened and added slowly to the mixture in order to be distributed therein as far as possible as individuals. In order to make the product flexible natural or synthetic resins may finally be added to the paste in solution or emulsion form in quantities which do not exceed the cellulose component of the viscose.

The paste produced in this way must now be brought into the desired foil shape, in which there is an opportunity to regenerate the cellulose xanthate in the paste to cellulose while the foil remains associated with at least one of the plates. This may most simply be carried out between two heatable pressure plates. The process can also be carried out continuously, in which case definite precautions must be maintained which are decisive for the quality of the foil. The plates which press the paste into a foil must have entirely smooth surfaces. They may also be shaped to give an imprint but must not, however, have irregular, sharp or re-entrant edges. Rolling out of the paste is essential, whereby a complete disorientation of the fibers in the foil is obtained. This is effected between plates by distributing a number of cakes of the paste on one plate and pressing out over the whole surface of the plate. When manufacture is carried out as a continuous process the desired effect is obtained by allowing the paste to issue through a slot onto a smooth, moving band. In this way fibers in the paste are oriented in the direction of travel of the moving band. A second band is caused to run over the paste in the same direction and is pressed onto the paste by rolls running transversely of the direction of travel of the moving band or by other pressing means. Preferably the motion of these rolls is so arranged that they sweep from the center of the moving band outwards while their return path lies through the air. The rolls may also be arranged to move transversely across the whole of the moving band. The rolls may also be arranged at an angle to one another. In order to give the product a high tear-resistance, the paste can be rolled out more strongly by hand and then compressed by guide strips, whereupon the fibers in the paste orient themselves transversely to the direction of thrust, i. e. longitudinally of the margin. The lower moving band, or the lower and upper moving bands, run closely associated with the deformed paste into a decomposition chamber at approximately 90° C. or into a decomposition bath of hot water or hot salt solution. The foil now passes into an acid bath, preferably consisting of dilute sulphuric acid in which a subsequent decomposition takes place and thereafter into wash baths in which the decomposition products of the xanthate and the pore-formers are washed out. It is advantageous to arrange squeeze rolls within the baths. Finally the foil passes into a bath of softeners and thence into the drying device. The foil can now either be rolled or cut into the desired shapes.

The porous foils produced by this process have a much greater resistance to chafing as compared to natural leather and have the same absorptive power. The surface is not fibrous and is smooth and grained like leather. The strength under wringing is excellent.

The following are specific examples showing how the process of the invention may be carried into effect. In Example 2, reference is made to the drawing, Figs. 1 and 2 which show one form of apparatus which can be used in a continuous operation according to the invention.

*Example 1*

An alkali cellulose which has only been slightly pre-ripened is sulphided with 45% $CS_2$ calculated on cellulose, and dissolved to form a viscose containing 8.0% cellulose and 5.0% NaOH. 7 kgms. of this viscose, after addition of 3 gms. of Indanthrene Yellow, are mixed in a stuff grinder with 6 kgms. of Glauber's salt having a granular size of 0.5 mm. and less, the Glauber's salt being sifted through a shaker sieve into the viscose during the kneading. 260 gms. of cotton of a staple length of about 30 mm. are uniformly distributed in the paste. Finally 25% of polystyrene, calculated on the cellulose in the viscose, is added. After intimately mixing for an hour the paste produced is placed in several portions on a heatable press plate. The counterplate is then pressed firmly onto the lower plate in a press until the spacing is 1.5 mm. The plates remain firmly united and are then heated to approximately 90° C. After two minutes the plates are released from one another and the foil is removed from the mould. After steeping in 5% sulphuric acid the foil is rinsed with water until all salt and decomposition products have been washed out. Finally it is dried.

*Example 2*

Alkali cellulose is sulphided with 50% of $CS_2$, calculated on cellulose, and dissolved to form a viscose containing 9% cellulose and 6% alkali. 7 kgms. of this viscose are mixed in a stuff grinder with 7 kgms. of sodium acetate of a granular size of 0.5 mm. and less. After 10 minutes 315 gms. of finely teased jute are added and then 6 kgms. of a fine Glauber's salt meal. After mixing for half an hour the paste is placed in a screw press and pressed through the outlet opening thereof, which is approximately 15 mms. by 60 mms., on to a moving metal band 1 shown in the drawings. A second moving band 2 of rubber covers the paste band. Both moving bands now travel over a table 3 where the overlying band 2 is pressed firmly by rolls of 4—7 onto the paste. These rolls 4—7 move from the center of the band with such an obliquity towards the margins of the band that no damming up of the paste under the front face of the rolls takes place. Two edge rolls 8 press out the paste still further at the margin. This marginal rolling out is reversed by pressure from the guide strips 9. The following rolls 10 and 11 press the paste out fully to a thickness of 1.5 mm. The paste now enters the decomposition chamber 12 heated to 80° C. On leaving this chamber over a roll 13 the foil passes into the vat 14 filled with water. In this vat the foil is washed out with kneading by the pair of rolls 15 and 16. The foil passes over squeeze rolls 17 and 18 into the cold water vat 19 where it is pressed out and kneaded between rolls 20 and 21. The foil passes between a pair of rolls 22 and 23 into a vat 24 containing a softening bath where it runs between rolls 25 and 26 and passes by way of final rolls 27 and 28 into a drying chamber and is subsequently reeled.

*Example 3*

Alkali cellulose is sulphided with 60% of carbon-disulphide CDA and dissolved to give a viscose containing 10% cellulose and 5% NaOH. 7 kgms. of this viscose are mixed in a stuff grinder with 15 gms. of Iron Oxide Yellow and 8 kgms. of phenanthrene. 400 gms. of hemp are added continuously. After mixing for approximately half an hour the paste is pressed out to a thickness of 1.5 mm. between steel plates. The plates while held tightly together are heated for an hour to 90° C. After opening the press mould the pore-formers and decomposed products are dissolved out from the leather by means of acetone and hot water.

Various changes and modifications can of course be made without departing from the scope of this invention as defined in the specification.

We claim:

1. A process for the production of porous foils from viscose, wherein the viscose is prepared from an alkali cellulose carbon bisulphide mixture containing above about 45% of carbon bisulphide relative to the cellulose content of the alkali cellulose, the viscose is mixed with strengthening fibers and with grains of a size not greater than 0.5 mm. of solid pore-forming compounds, which do not cause premature coagulation of the viscose and can be dissolved out again from the porous foil, the mixture is then distributed between two moving smooth surfaces and pressed therebetween to the desired thickness, the originally present longitudinal orientation of the fibers in the viscose being disoriented by applying rolling pressure to the mixture in a direction transversely of the direction of movement of said surfaces, and the mixture then heated to decompose the cellulose xanthate while still associated with at least one of the surfaces, whereafter the foils so formed are washed and dried.

2. A process for the production of porous foils as claimed in claim 1 and wherein said solid pore-forming compounds are of inorganic material.

3. A process for the production of porous foils as claimed in claim 1 and wherein said solid pore-forming compounds are of organic material.

4. A process as claimed in claim 1, and wherein resins are added to the viscose in quantities which do not exceed the cellulose component of the viscose.

5. A process as claimed in claim 1, and wherein natural resins are added to the viscose in quantities which do not exceed the cellulose component of the viscose.

6. A process as claimed in claim 1, and wherein synthetic resins are added to the viscose in quantities which do not exceed the cellulose component of the viscose.

7. A process as claimed in claim 1, and wherein resins in solution are added to the viscose in quantities which do not exceed the cellulose component of the viscose.

8. A process as claimed in claim 1, and wherein resins in emulsion form are added to the viscose in quantities which do not exceed the cellulose component of the viscose.

9. A process as claimed in claim 1, and wherein polystyrene synthetic resin is added to the viscose in a quantity which does not exceed the cellulose component of the viscose.

10. A process as claimed in claim 1, and wherein the strengthening fibers are oriented longitudinally in the margin of the foil by rolling.

KURT ENSSLIN.
HERMANN RATHERT.

References Cited in the file of this patent

UNITED STATES PATENTS

| Number | Name | Date |
| --- | --- | --- |
| 1,949,175 | Netzel | Feb. 27, 1934 |
| 2,107,637 | Lefebre-Carnot et al. | Feb. 8, 1938 |
| 2,116,611 | Vautier et al. | May 10, 1938 |
| 2,442,443 | Swallow | June 1, 1948 |
| 2,540,906 | Overton et al. | Feb. 6, 1951 |

FOREIGN PATENTS

| Number | Country | Date |
| --- | --- | --- |
| 435,128 | Great Britain | Sept. 16, 1935 |